United States Patent
Kobayashi et al.

(10) Patent No.: US 7,302,563 B2
(45) Date of Patent: Nov. 27, 2007

(54) MAILING LIST SERVER AND MAIL RE-SENDING METHOD THEREOF

(75) Inventors: Yutaka Kobayashi, Kawasaki (JP); Tomofumi Yokota, Kawasaki (JP); Naoyasu Terao, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 867 days.

(21) Appl. No.: 10/345,923

(22) Filed: Jan. 17, 2003

(65) Prior Publication Data

US 2003/0188149 A1   Oct. 2, 2003

(30) Foreign Application Priority Data

Mar. 29, 2002   (JP) ............... 2002-098009

(51) Int. Cl.
*H04L 9/00* (2006.01)
*G06F 7/04* (2006.01)
(52) U.S. Cl. .......................... 713/150; 726/3
(58) Field of Classification Search ............... 713/150; 726/3
See application file for complete search history.

(56) References Cited

U.S. PATENT DOCUMENTS 5,530,758 A * 6/1996 Marino et al. ............... 713/150
6,115,472 A * 9/2000 Shimizu et al. .............. 380/262
6,502,192 B1 * 12/2002 Nguyen ........................... 726/4
6,775,711 B1 * 8/2004 Akimoto ...................... 709/245
6,986,037 B1 * 1/2006 Assmann ...................... 713/155

FOREIGN PATENT DOCUMENTS

JP   A-10-111855   4/1998
JP   A-2001-186120   7/2001

* cited by examiner

*Primary Examiner*—Emmanuel L. Moise
*Assistant Examiner*—Ali S Abyaneh
(74) *Attorney, Agent, or Firm*—Oliff & Berridge, PLC (57) ABSTRACT

A mailing list server and a mail re-sending method thereof with which, when a mail recipient has been unable to decrypt a mail, it is possible to re-send the mail compatibly encrypted in a form such that the recipient can decrypt it without fail. A mail re-send request from a member is made by HTTP, received by a web server 20, and processed by an application server 21. For example, re-send request information is sent to the web server 20 by a mailing list member, using an input form of a web page 303 from the web server 20. The application server 21 determines an encryption method on the basis of a user encryption method specification included in the mail re-send request. A sending part 101 encrypts the mail by the determined method and sends it to the member's address.

15 Claims, 8 Drawing Sheets

MAILING LIST SERVER AND MAIL RE-SENDING METHOD THEREOF

BACKGROUND OF THE INVENTION

This invention relates to technology for processing mail sent from a secure mailing list using public key infrastructure or the like, and particularly to technology for, when it has not been possible to decrypt an encrypted mail, requesting that the encrypted mail be re-sent by an encryption method such that it can be decrypted.

Encrypted mail sent using a secure mailing list sometimes cannot be decrypted (cannot be read) by a user, because of the user's environment. In this case, it is desirable for the user who has been unable to decrypt the encrypted mail to send to the secure mailing list server a re-send request requesting that the encrypted mail be re-sent. And furthermore it is desirable that the re-sent mail be decryptable by the user without fail.

SUMMARY OF THE INVENTION

It is therefore an object of the present invention to provide a secure mailing list with a function for re-sending encrypted mail using an encryption algorithm such that the user can decrypt the mail.

In this invention, to achieve this object and other objects, constructions set forth in the claims are employed. Here, before the invention is explained in detail, a supplementary explanation of that which is set forth in the claims will be given.

That is, according to a first aspect of the invention, to achieve this object and other objects, a mailing list server is provided with a mail storing section for storing distributed mail, a receiving section for receiving from a member of a mailing list a mail re-send request including an identifier of a mail to be re-sent and an attribute of an encryption method, a retrieving section for retrieving a mail from the mail storing section on the basis of the identifier of a mail to be re-sent in the mail re-send request, an encrypting section for encrypting the retrieved mail on the basis of the encryption algorithm attribute in the mail re-send request, and a sending section for sending the encrypted mail to the mail address of the member who made the mail re-send request.

In this construction, an attribute of an encryption method of the user included in the mail re-send request is used to encrypt the mail in such a form that it is decryptable by the user's device, and consequently the member can decrypt and read the content of the re-sent mail without fail.

The mail re-send request may be sent by HTTP or may be sent by mail transmission. When the re-send request is sent by mail transmission, a description of the user's encryption method can be sent to the mailing list server by the user applying an electronic signature.

The invention can also be applied to a mail user agent device for sending encrypted mail. That is, a mail user agent device may be enabled to receive a re-send request from another mail user agent device and re-send a compatibly encrypted mail to an addressee.

That is, according to a second aspect of the invention, a mail user agent device including a receiving section for receiving an encrypted mail sent from a mailing list server, a decrypting section for decrypting the received mail, and a re-send request sending section for sending to the mailing list server a mail re-send request including an identifier of the mail to be re-sent and an attribute of an encryption method, when decryption of the encrypted mail has failed.

And, according to a third aspect of the invention, a mail user agent device comprising a receiving section for receiving an encrypted mail sent from another mail user agent device, a decrypting section for decrypting the received encrypted mail, and a re-send request sending section for sending to the other mail user agent device a mail re-send request including an identifier of the mail to be re-sent and an attribute of an encryption method, when decryption of the encrypted mail has failed.

These inventions can not only be realized as a device or system but is also realizable as a method. And parts of such an invention can of course be constituted as software. And naturally the technical scope of the invention also includes software products used for making a computer execute such software.

DETAILED DESCRIPTION OF THE PREFERRED EMBODIMENTS

A preferred embodiment of the invention will now be described.

Figure 1:
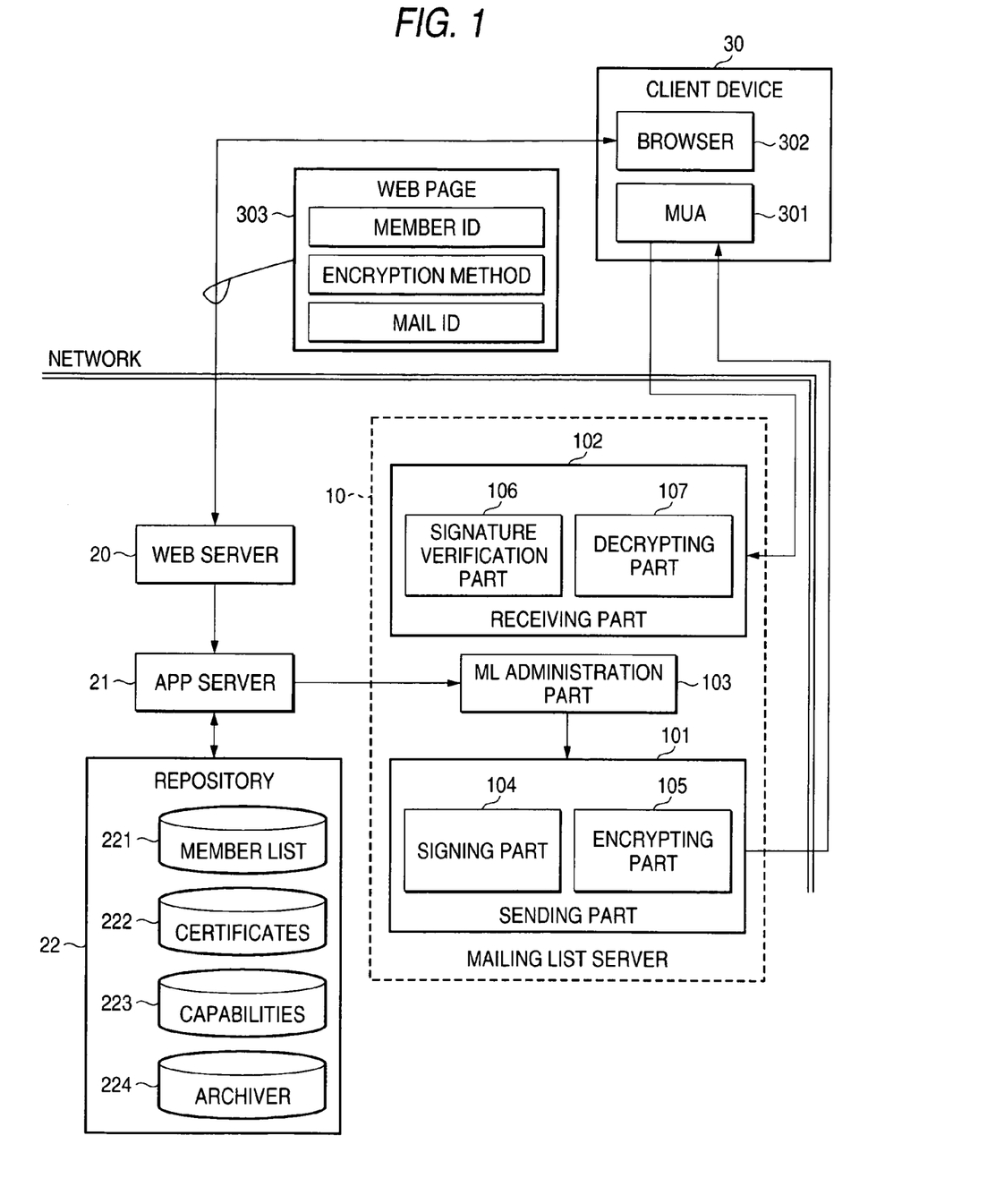
FIG. 1 is a block diagram showing a preferred embodiment of the invention.

FIG. 1 shows a mailing list server 10 constituting a preferred embodiment of the invention, and this mailing list server 10 is constructed to accept mail re-send requests by HTTP.

Referring to FIG. 1, the mailing list server 10 has a sending part 101, a receiving part 102 and a mailing list administration part 103. Along with the mailing list server 10, to implement a mailing list service and services related to this, there are also provided a web server 20, an application server 21 and a repository 22. The sending part 101 includes a signing part 104 and an encrypting part 105. The repository 22 includes a member list store 221, a certificate store 222, an S/MIME capability store 223 and a mail archiver 224.

A client terminal 30 includes a mail user agent program 301 and a web browser program 302. The mail user agent program 301 sends and receives mail to and from the sending part 101 and the receiving part 102 of the mailing list server 10 by way of a network (for example the Internet) (not shown). The web browser program 302 sends and receives HTTP messages to and from the web server 20 on the mailing list server 10 side.

The receiving part 102 receives mail from members, performs appropriate signature verification and decrypting using a signature verification part 106 and a decrypting part 107, and stores the mail in the mail archiver 224. The signing part 104 is used to electronically sign mail for distribution and the encrypting part 105 is used to encrypt outgoing mail, which is then sent out by the sending part 101. Signature verification and encrypting are carried out with reference to the member list store 221 and the certificate store 222.

Mail re-send requests from members are made using HTTP, received by the web server 20, and processed by the application server 21. For example, re-send request information is sent to the web server 20 using an input form of a web page 303 received from the web server 20. the application server 21 executes control so that mail is re-sent using encryption performed on the basis of an encryption method specified by the user in the mail re-send request.

Figure 2:
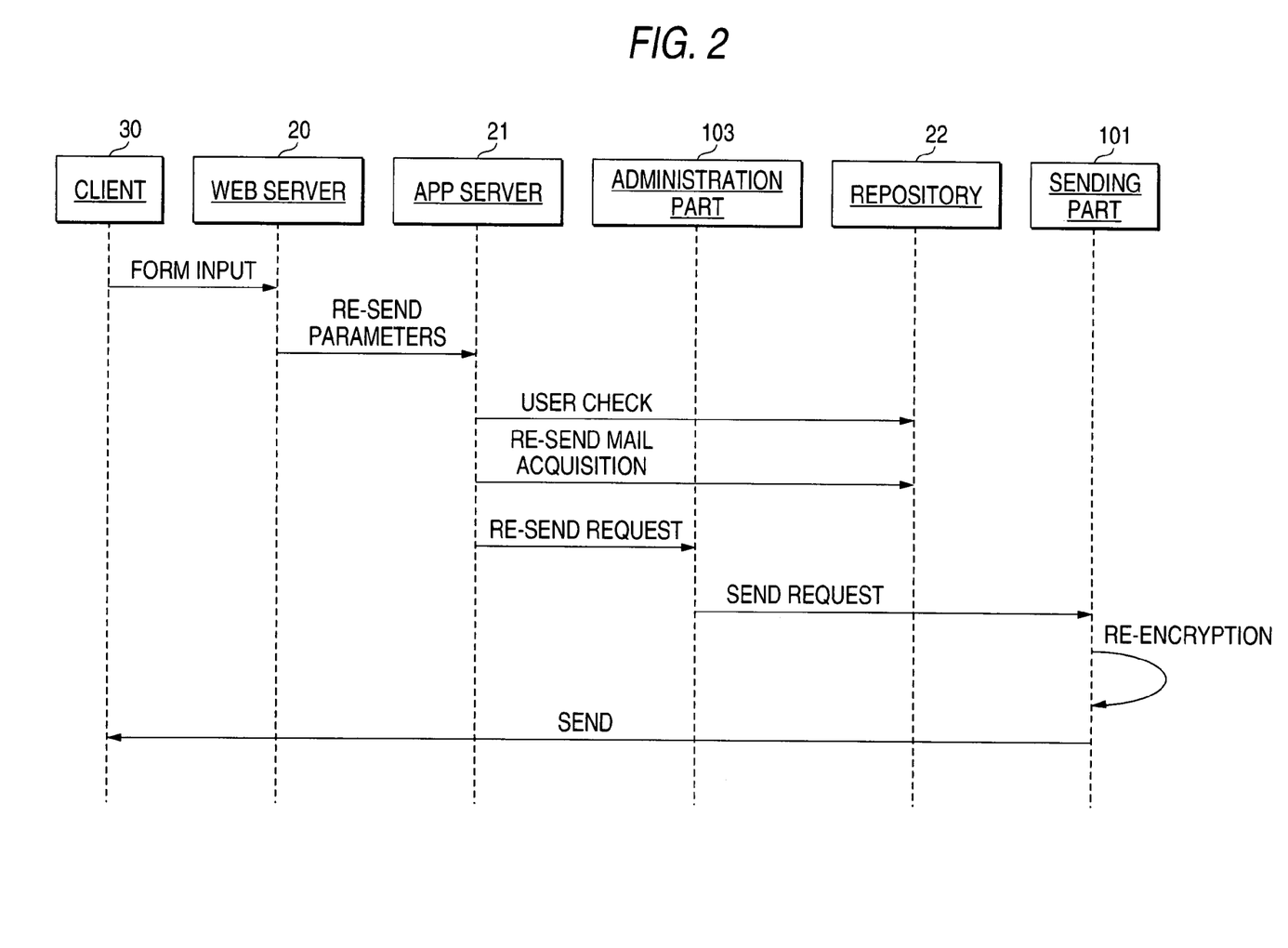
FIG. 2 is a view illustrating the operation of this preferred embodiment.

FIG. 2 shows the flow of processing of a mail re-send request. First, a member of a mailing list (ML) having received a mail which he/she cannot decrypt requests re-sending of the encrypted mail via the web server 20. It is necessary for the mailing list server 10 to be archiving messages submitted to the mailing list in the mail archiver 224. The specific processing is as follows.

[1]: The ML member goes through SSL (Secure Socket Layer) client certification and connects to the web server 20 (the mailing list server 10 performs the client certification using a certificate submitted by the ML member).

[2]: The ML member uses an input form on a web page or the like to input information specifying the encrypted mail that they want re-sending (for example an administration number, the subject or time of submission of the message, or the mail address of the contributor of the message).

[3]: The ML member specifies an encryption algorithm and so on with which they would like the re-sent mail to be encrypted.

[4]: The mailing list server 10 re-sends the specified mail to the ML member, encrypted using the encryption algorithm and so on specified by the ML member.

With this preferred embodiment, because an encryption algorithm and soon (for example a symmetrical encryption algorithm and a key length) are specified by the ML member when mail is re-sent, the ML member can certainly decrypt and read the re-sent mail. And because SSL client certification is carried out before the mail re-send request is accepted, there is no risk of mail being re-sent to someone other than the member.

Next, another preferred embodiment of the invention will be described. In this preferred embodiment, re-sending of a mail is requested by sending a mail containing a re-send command to an administration mail address of the mailing list server 10.

Figure 3:
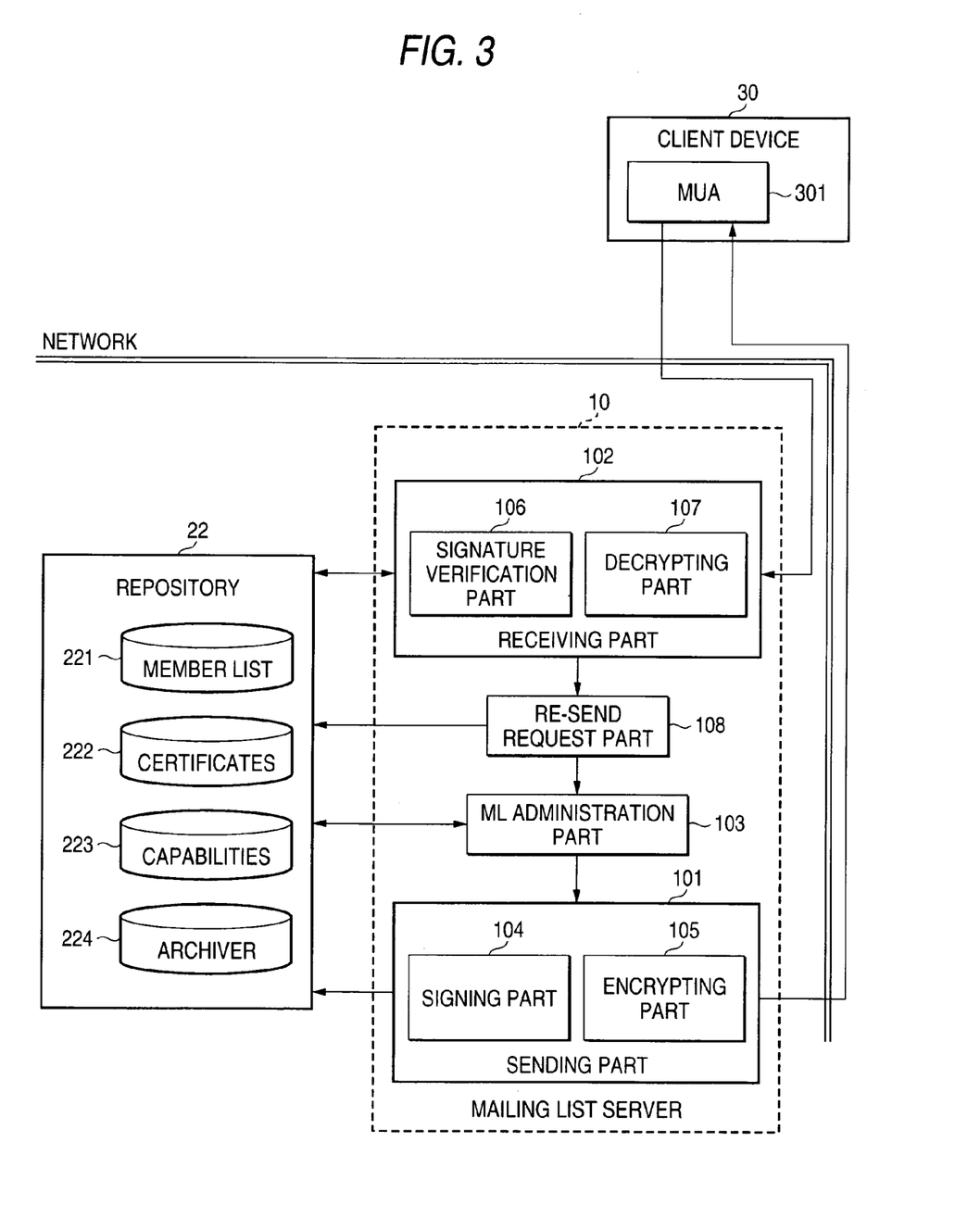
FIG. 3 is a block diagram showing another preferred embodiment of the invention.

FIG. 3 shows a mailing list server 10 of this preferred embodiment, and parts in this figure corresponding to parts in FIG. 1 have been given the same reference numbers. In this example, mail for the administration mail address is received by the receiving part 102, a command contained in this mail is sent to a re-send request part 108, and the re-send request part 108 makes a re-send processing request to the mailing list administration part 103. The receiving part 102 receives ordinary submitted mail at a mail address for submissions (different from the administration mail address).

Figure 4:
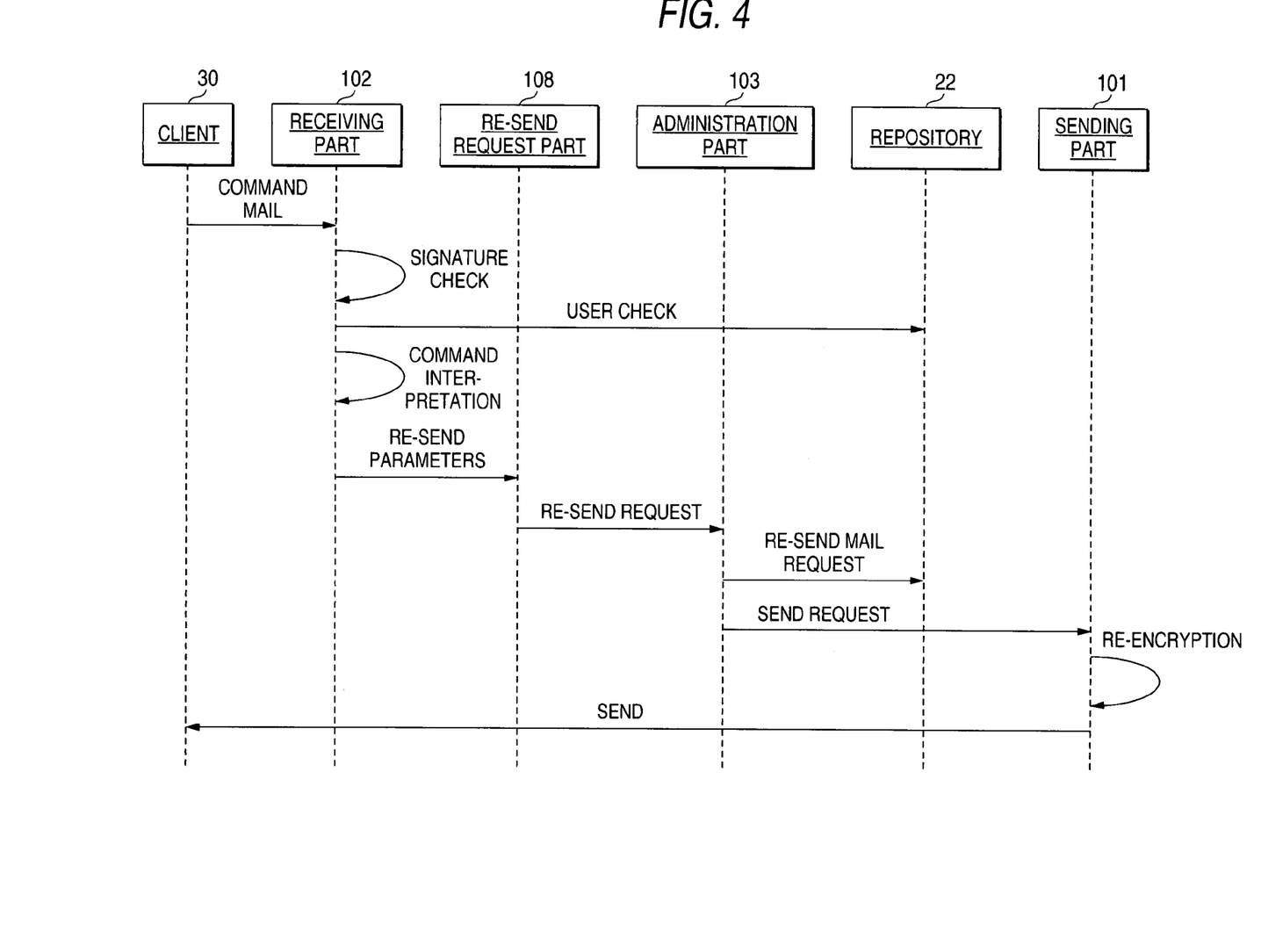
FIG. 4 is a view illustrating the operation of this preferred embodiment.

FIG. 4 shows the flow of processing of a mail re-send request in this preferred embodiment. First, a member of the ML having received a mail which he/she cannot decrypt requests re-sending of the encrypted mail using a command mail addressed to the administration mail address. In this case also it is necessary for the mailing list server 10 to be archiving messages submitted to the mailing list in the mail archiver 224. The specific processing is as follows.

[1]: The ML member composes a command mail including information specifying the encrypted mail that they want re-sending (for example an administration number, the subject or time of submission of the message, or the mail address of the contributor).

[2]: The ML member signs the composed command mail with their own private key and sends it to the mailing list server 10 (the administration mail address).

[3]: The mailing list server 10 verifies the signed mail from the ML member. (After the signature verification, an ML member check and so on are also carried out.)

[4]: The mailing list server 10 re-sends the specified mail to the ML member, encrypted using an encryption algorithm and so on specified by the ML member.

Figure 5:
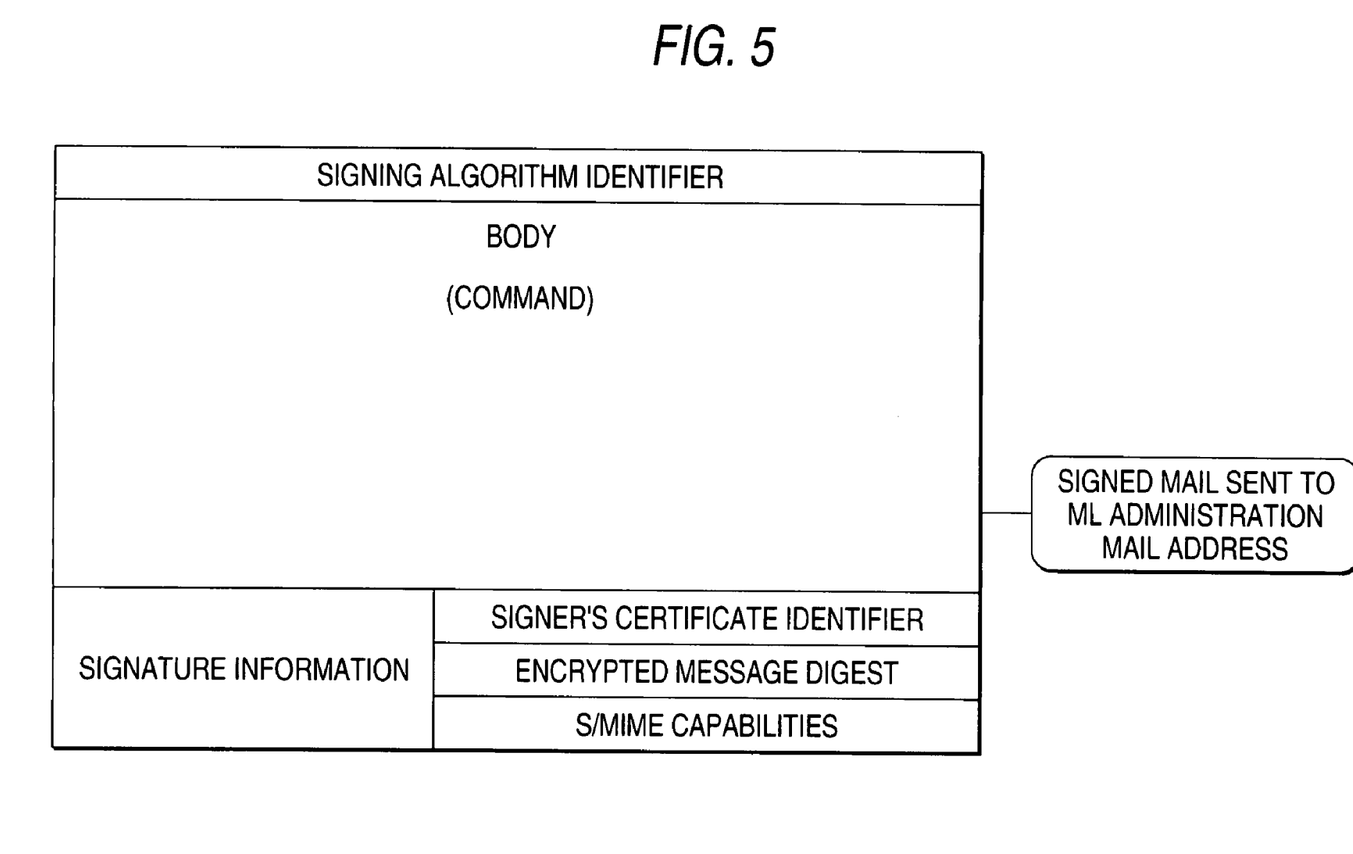
FIG. 5 is a view illustrating a signed mail used in this preferred embodiment.

The command mail is for example as shown in FIG. 5. In the example in this figure, the command mail is sent to an administration mail address of the mailing list; however, alternatively the command mail may be sent to the mail address for submissions to the mailing list. In this case, it is necessary for it to be distinguished whether an incoming mail is a submission or a re-send request.

The command mail is signed before being sent, and this signed mail includes the kind of signature information shown in FIG. 5. Using an SMIME capability in this signature information it is possible to acquire information indicating a symmetrical encryption algorithm and a key length and re-send a compatibly encrypted mail.

Another preferred embodiment of the invention will now be described. In this preferred embodiment, re-sending of a distributed mail (decrypting of which has failed) is requested by returning the mail to the mailing list server 10. This mail will be referred to in the following as a 're-send request mail'.

Figure 6:
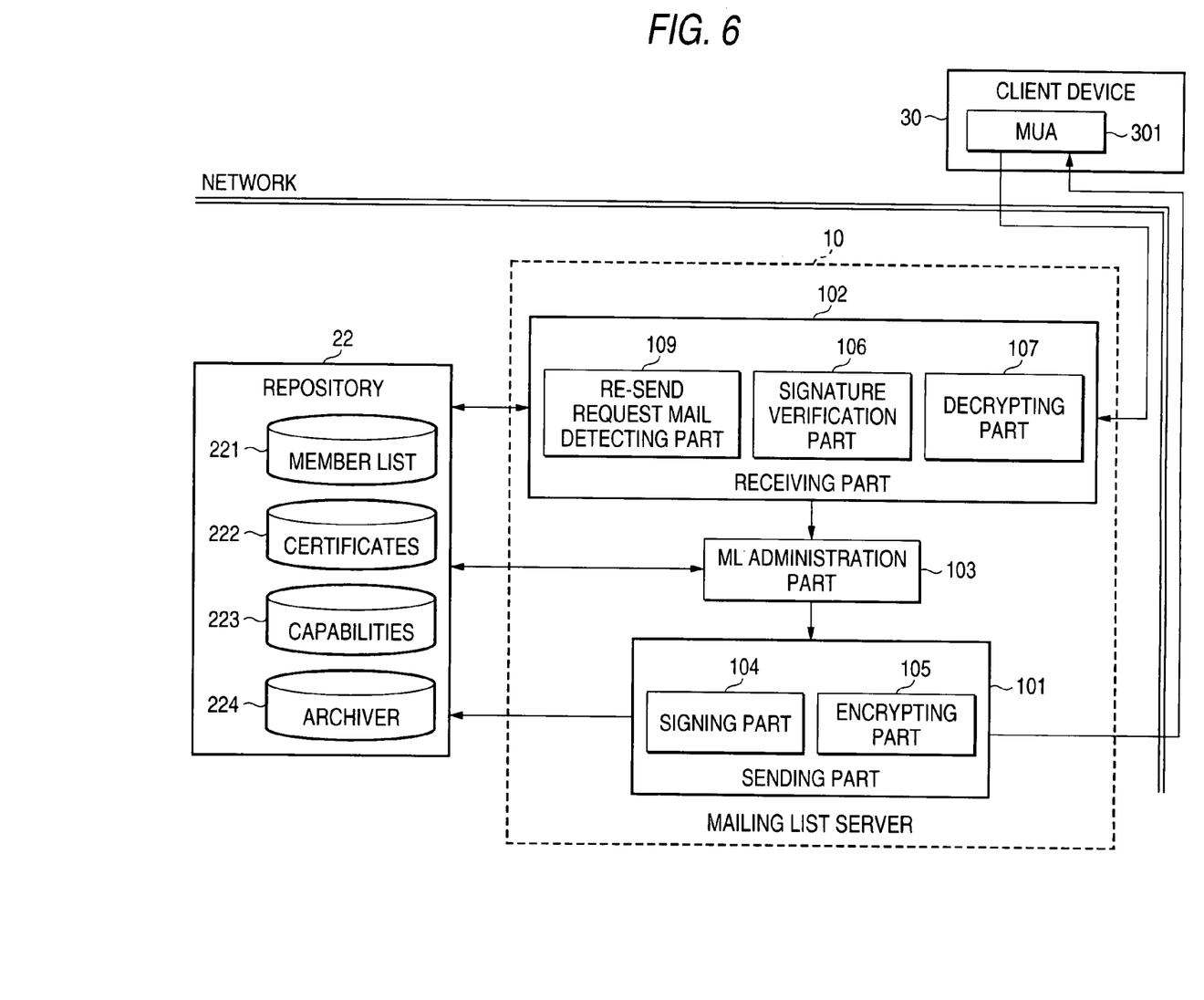
FIG. 6 is a block diagram showing a further preferred embodiment of the invention.

FIG. 6 shows a mailing list server 10 of this preferred embodiment, and parts in this figure corresponding to parts in FIG. 1 or FIG. 3 have been given the same reference numbers. In this example, mail is received by the receiving part 102, a re-send request mail detecting part 109 detects whether or not this mail is a re-send request mail, and when it is a re-send request mail a re-send request is made to the mailing list administration part 103. The receiving part 102 receives ordinary submitted mail as well as mail including a re-send request. The receiving part 102 has a signature verification part 106 and a decrypting part 107.

Figure 7:
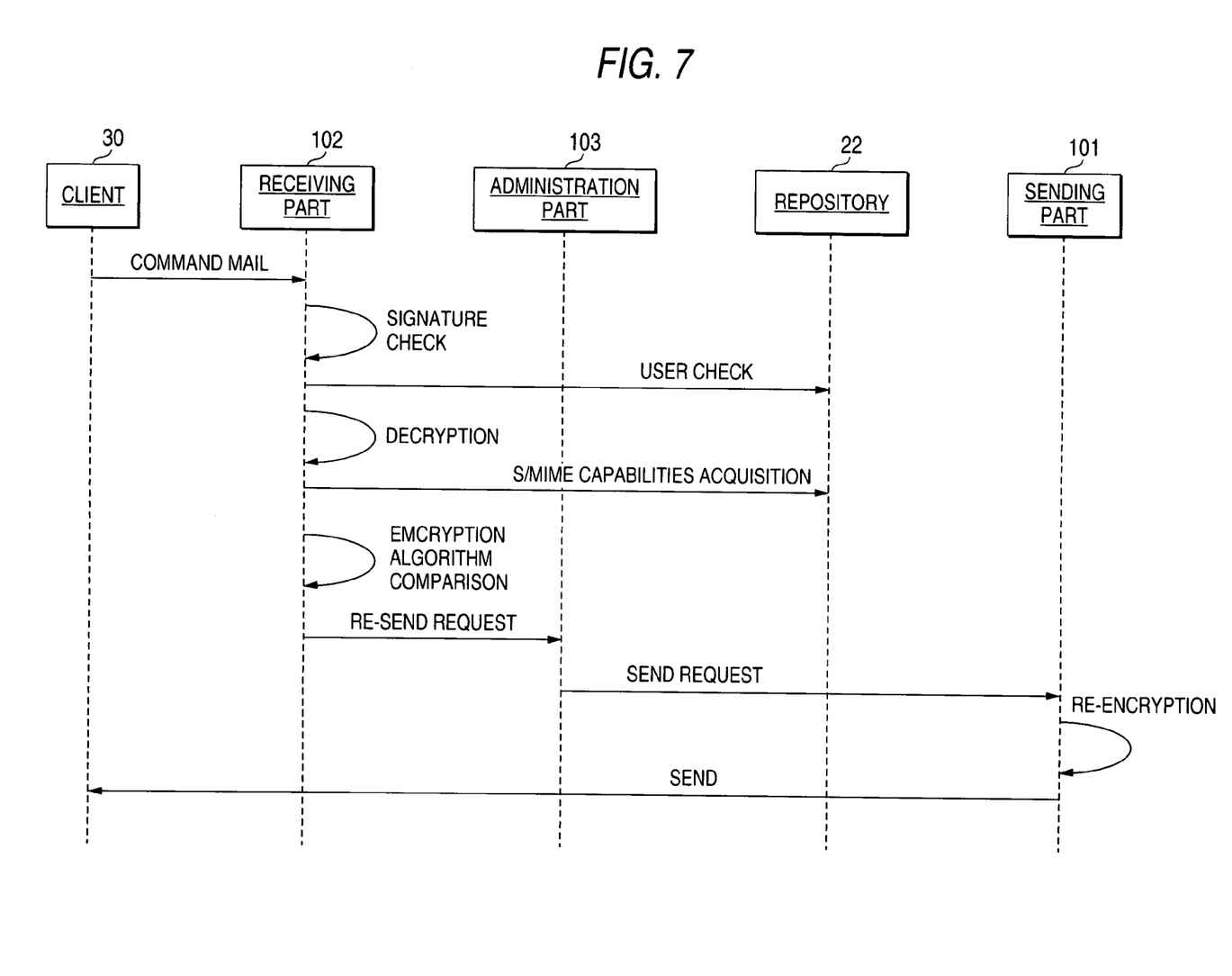
FIG. 7 is a view illustrating the operation of this preferred embodiment.

FIG. 7 shows the flow of processing of a mail re-send request in this preferred embodiment. A ML member having received a mail which he/she cannot decrypt requests re-sending of the encrypted mail using a returned mail (a re-send request mail). In this case also, it is necessary for the mailing list server 10 to be archiving messages submitted to the mailing list in the mail archiver 224. The specific processing is as follows. Because with this method the problem mail is simply returned, compared to the other methods the operation to be carried out by the ML member is simpler. But because the return address is the normal ML address, the issue arises of how to distinguish such mail from ordinary submitted mail.

[1]: The ML member signs the mail which they were unable to decrypt with their own private key and sends it back to the mailing list server 10.

[2]: The mailing list server 10 verifies the signed mail from the ML member. (After the signature verification, an ML member check and so on are also carried out.)

[3]: The mailing list server 10 extracts encryption algorithm information included in the signed mail from the ML member.

[4]: The mailing list server 10 extracts the encrypted mail from the signed mail sent in by the ML member, and obtains the encryption algorithm used on that.

[5]: The mailing list server 10 compares the encryption algorithms obtained in [3] and [4], and checks that the algorithm from [4] is not included in the algorithm information from [3] (if it is included, then because it cannot be the case that the encrypted mail is one which the ML member has received and been unable to read, this incoming mail is processed as an ordinary submitted mail).

[6]: The mailing list server 10 retrieves the original of the returned (or forwarded) mail from the mail archiver 224, encrypts it on the basis of the encryption algorithm information included in the signed mail, and re-sends this encrypted mail to the ML member.

Alternatively, the original encrypted mail included in the body of the returned signed mail can be decrypted with the private key of the mailing list server 10 to obtain the original mail, and this can be encrypted on the basis of the encryption algorithm information included in the signed mail and re-sent to the ML member.

Figure 8:
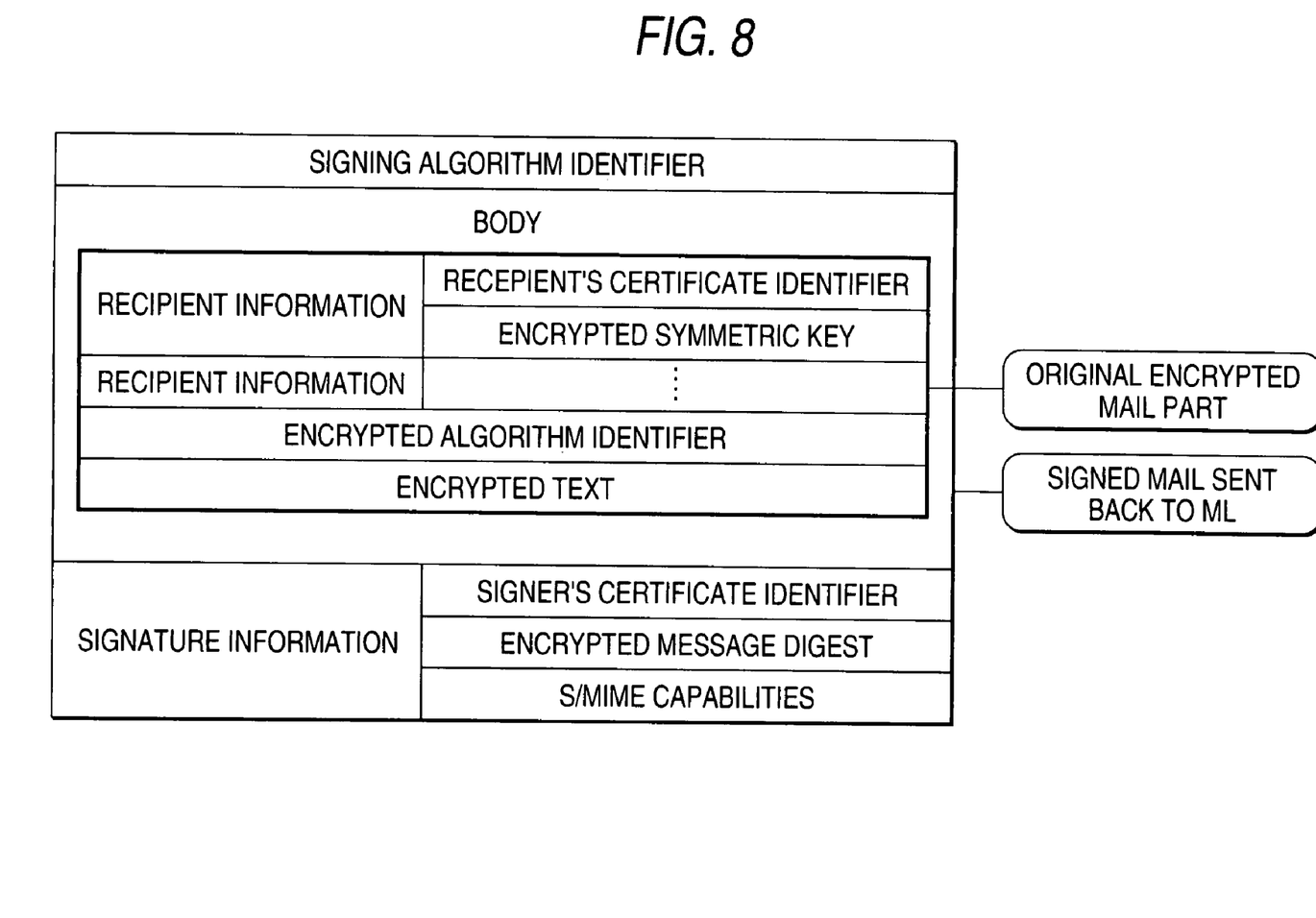
FIG. 8 is a view illustrating a signed mail used in this preferred embodiment.

FIG. 8 is a schematic view of the structure of the mail returned in [1]. The encrypted mail originally sent from the ML server, which could not be read, is included unchanged in the body of the signed mail.

This invention is not limited to the preferred embodiments described above, and various changes are possible within the scope of the invention. For example, although in the foregoing examples the invention was applied to a mailing list server, the invention can also be applied to an ordinary mail user agent device. In this case, the mail user agent is provided with a re-send request part 108 and a re-send request mail detecting part 109 of the kind mentioned above, and an encrypted mail is re-sent on the basis of encryption algorithm information acquired from a signed mail.

As described above, with this invention, when it has not been possible to decrypt a distributed mail, it is possible to request re-sending of the mail in a form such that it can be decrypted by the addressee without fail.

What is claimed is:

1. A mailing list server comprising:
a mail storing section for storing distributed mails;
a receiving section for receiving from a member of a mailing list a mail re-send request including an identifier of a mail to be re-sent and an attribute of an encryption method;
a retrieving section for retrieving a mail from the mail storing section on the basis of the identifier of a mail to be re-sent in the mail re-send request;
an encrypting section for encrypting the retrieved mail on the basis of the encryption method indicated by the attribute of the encryption method included in the mail re-send request; and
a sending section for sending the encrypted second copy of the mail to the mail address of the member, wherein the mail re-send request causes the sending section to send the encrypted second copy of the mail to the mail address of the member independent of additional parameters inputted by the member or a user other than the member.

2. The mailing list server according to claim 1, wherein the mail re-send request is sent by means of HTTP.

3. The mailing list server according to claim 1, wherein the mail re-send request is sent by means of a mail including a command ordering a re-send.

4. The mailing list server according to claim 3, wherein the mail by means of which the re-send request is made includes an electronic signature with electronically-signed information including a specification of an encryption method of the member making the re-send request.

5. The mailing list server according to claim 1, wherein the mail re-send request is made by means of a returned mail or a forwarded mail comprising the mail to be re-sent returned or forwarded to a mailing list mail address or an administration mail address of the mailing list.

6. A mail re-sending method of a mailing list server comprising:
storing distributed mails;
receiving from a member of a mailing list a mail re-send request including an identifier of a mail to be re-sent and an attribute of an encryption method;
retrieving a mail from the stored mails on the basis of the identifier of a mail to be re-sent in the mail resend request;
encrypting the retrieved mail on the basis of the encryption method indicated by the attribute of the encryption method included in the mail re-send request; and
sending the encrypted mail to the mail address of the member who made the mail re-send request independent of additional parameters inputted by the member or a user other than the member.

7. A mail user agent device comprising:
a receiving section for receiving an encrypted mail sent from a mailing list server;
a decrypting section for decrypting the received mail; and
a re-send request sending section for sending, when decryption of the encrypted mail has failed, to the mailing list server a mail re-send request including an identifier of the mail to be re-sent and an attribute of an encryption method, wherein the mail re-send request causes the mailing list server to encrypt, independent of parameters the mail re-send request, the mail using the encryption method and to send a copy of the mail encrypted using the encryption method to the mail user agent device.

8. The mail user agent device according to claim 7, wherein the mail re-send request is sends by means of HTTP.

9. A mail user agent device according to claim 7, wherein the mail re-send request is sent by means of a mail including a command ordering a re-send.

10. The mail user agent device according to claim 7, wherein the email re-send request is made by means of a returned mail or a forwarded mail comprising the mail to be re-sent returned or forwarded to a mailing list mail address or an administration mail address of the mailing list.

11. A mail re-sending method of a mail user agent device comprising:
receiving an encrypted mail sent from a mailing list server;
decrypting the received mail; and
sending, when decryption of the encrypted mail has failed, to the mailing list server a mail re-send request including an identifier of the mail to be re-sent and an attribute of an encryption method, wherein the mail re-send request causes the mailing list server to encrypt,independent of parameters other than the re-send request, the mail using the encryption method and to send a copy of the mail encrypted using the encryption method to the mail user agent device.

12. A mailing list server comprising:
a mail storing section for storing distributed mail;
a receiving section for receiving from a member of a mailing list a mail re-send request including an identifier of a mail to be re-sent and an attribute of a member-indicated encryption method, wherein the mailing list server has delivered to the member a first copy of the mail encrypted using a first encryption method different from the member-indicated encryption method;

a retrieving section for retrieving a second copy of the mail from the mail storing section on the basis of the identifier of the mail;

an encrypting section for encrypting the second copy of the mail on the basis of the member-indicated encryption method; and a sending section for sending the encrypted second copy of the mail to the mail address of the member, wherein the mail re-send request causes the sending section to send the encrypted second copy of the mail to the mail address of the member independent of additional parameters inputted by the member or a user other than the member.

13. A mail re-sending method of a mailing list server comprising the steps of:

storing a distributed mail;

receiving from a member of a mailing list a mail re-send request including an identifier of a mail to be re-sent and an attribute of a member-indicated encryption method, wherein the mailing list server has delivered to the member a first copy of the mail encrypted using a first encryption method different from the member-indicated encryption method;

retrieving a second copy of the mail stored in the mail storing step on the basis of the identifier of the mail;

encrypting the second copy of the mail on the basis of the member-indicated encryption method; and sending the encrypted second copy of the mail to the mail address of the member independent of additional parameters inputted by the member or a user other than the member.

14. A mail user agent device comprising:

a receiving section for receiving an encrypted mail sent from a mailing list server, wherein the encrypted mail is encrypted using a first encryption method;

a decrypting section for decrypting the received mail; and a re-send request sending section for sending. when decryption of the encrypted mail has failed, to the mailing list server a mail re-send request including an identifier of the mail to be re-sent and an attribute of an indicated encryption method, different from the first encryption method, wherein the mail re-send request causes the mailing list server to encrypt, independent of parameters other than the re-send request, the mail using the indicated encryption method and to send a copy of the mail encrypted using the indicated encryption method to the mail user agent device.

15. A mail re-sending method of a mail user agent device comprising the steps of:

receiving an encrypted mail sent from a mailing list server, wherein the encrypted mail is encrypted using a first encryption method;

decrypting the received mail; and sending, when decryption of the encrypted mail has failed, to the mailing list server a mail re-send request including an identifier of the mail to be re-sent and an attribute of an indicated encryption method, different from the first encryption method, wherein the mail re-send request causes the mailing list server to encrypt, independent of parameters other than the re-send request, the mail using the indicated encryption method and to send a copy of the mail encrypted using the indicated encryption method to the mail user agent device.

* * * * *